Dec. 10, 1968  J. L. MARTIN  3,415,565

TREE SHAKING DEVICE

Filed Dec. 16, 1966

INVENTOR

JACK L. MARTIN

BY *Kimmel, Crowell & Weaver*

ATTORNEYS.

United States Patent Office 3,415,565
Patented Dec. 10, 1968

3,415,565
TREE SHAKING DEVICE
Jack L. Martin, 5144 Western Ave.,
Olivehurst, Calif. 95961
Filed Dec. 16, 1966, Ser. No. 602,350
10 Claims. (Cl. 294—103)

ABSTRACT OF THE DISCLOSURE

Mounting supports for resilient tubular buffer members utilized for gripping and shaking trees is described. The mounting support has an elongate supporting surface provided with a concave incurvation in the center of the elongate surfaces with transversely concavely incurvated elongately linear end portions for supporting the resilient tubular member and partial cylindrical inserts for engaging the ends of the resilient tubular members are disclosed.

Cross-reference to related application

The invention described herein constitutes an improvement over my tree shaking device described in application Ser. No. 529,619, filed Feb. 23, 1966, now abandoned.

Field of the invention.—This invention relates to nut harvesting devices in general and in particular to devices for shaking nut and fruit trees to cause said nuts and fruits to fall as a step in the harvesting operation.

Description of the prior art.—Tree shakers generally of the type described herein are well known in the prior art. One such tree shaker is described in my co-pending application. Generally speaking, the tree shaking devices of the prior art have been subjected to several disadvantages, among them being the comparatively short life of the resilient buffering unit which physically contacts the tree and the difficulty or impossibility of replacing these units. This problem was partially obviated by the shaking device described in my co-pending application; however, the adaptability of the shaking device described in my co-pending application is somewhat limited and its ability to grip trees, especially small trees and small limbs, was not entirely satisfactory. These problems are substantially solved by the present invention.

Summary

The present invention is directed to the jaw configuration of a shaking apparatus in which a pair of tubular resilient buffer members are secured at each end by partial cylindrical inserts extending a distance into the cylinders, said cylinders being supported by an elongate surface, the center of which is flat transversely of the elongate dimension and concavely incurvated in the elongate dimension; each end of the surface is substantially linear in the elongate direction but arcuately incurvated in the transverse direction and is especially adapted for easy and convenient attachment to existing tree shaking devices. The object, therefore, of the present invention is the provision of an improved shaking device jaw construction designed for more certain gripping of small trees and limbs, and easier adaptability to existing shaking devices.

Description of the preferred embodiment

Figure 1:
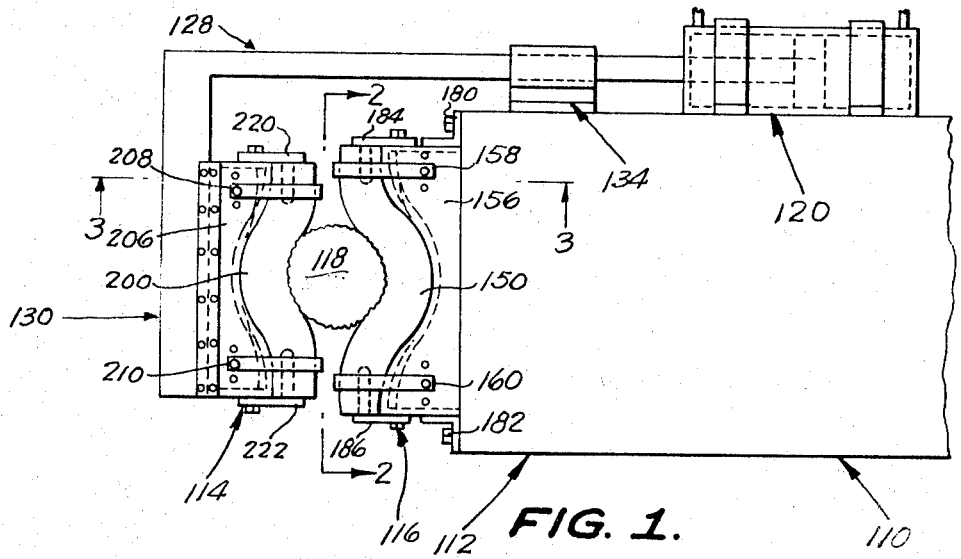
FIGURE 1 is a top plan view of the shaking device of this invention showing the opposed jaw configuration of this invention.
Figure 2:
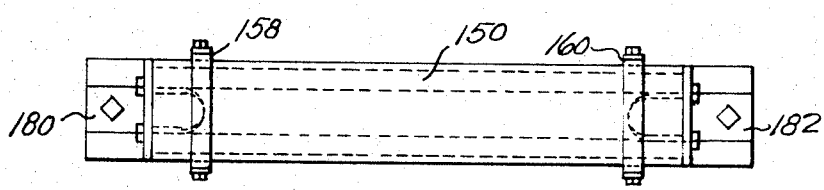
FIGURE 2 is a front view of a jaw configuration according to the present invention taken substantially along lines 2—2 in the direction of the arrows as shown in FIGURE 1.

The over-all construction of the shaker jaw generally is adequately described in my co-pending application, the disclosure of which is incorporated herein. As shown in FIGURE 1, such a tree shaking device 110 has as its major components a movable frame 112, a pair of cushioned jaw means 114 and 116 mounted on frame 112 to form an opening in which a tree 118 may be located. The tree shaker 110 is preferably equipped with an adjustable mounting means shown generally at 120 and includes a movable arm 128 having a beam 130 constituting the other arm upon which cushioned means 114 is secured. Movable arm 128 includes a shank constrained for linear sliding movement by a guide 134.

Figures 3, 4:
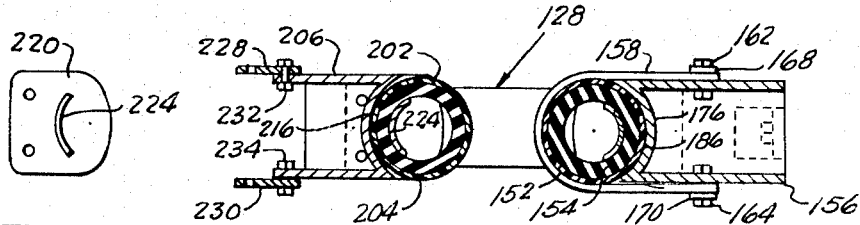
FIGURE 3 is a side cross-sectional view of the jaw configuration of the present invention taken substantially along lines 3—3 in the direction of the arrows as shown in FIGURE 1.
FIGURE 4 is a detailed view of an end plate member showing the partial cylindrical insert for engaging the ends of the tubular resilient buffer members.
Figures 5, 6:
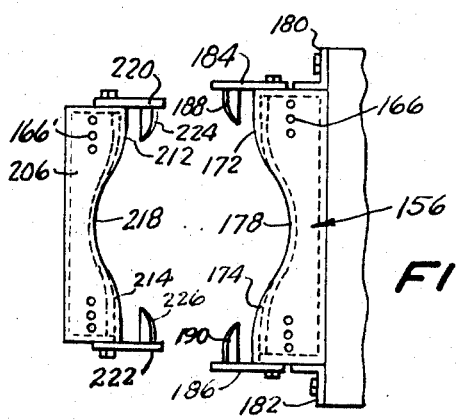
FIGURE 5 is a top plan view of the support elements of the jaw configuration of the present invention.
FIGURE 6 is an alternative and preferred method for securing the resilient tubular buffer members to the support backing member.

Cushion means 116 comprises an elongate tubular resilient buffer member 150 which, as best shown in FIGURE 3, has a relatively hard covering portion 152 and a relatively softer interior portion 154, as described in my co-pending application. The buffer member 150 is secured to support backing member 156 by a pair of straps 158 and 160 which may be secured by bolts 162 and 164 which may be held in place by nuts or received in threaded apertures 166, as shown in FIGURE 6. Washers 168 and 170 may be provided in the conventional manner.

As shown in FIGURE 5, the support backing member has an elongate surface which is provided with end portions 172 and 174 which are linear in the elongate direction, as shown in FIGURE 5, and are arcuately incurvated in a direction transversely of the elongate direction, as shown at 176 in FIGURE 3. The elongate surface is concavely incurvated in the central portion in the elongate direction, as shown at 178 in FIGURE 5.

The support backing member may be secured to the shaking device by brackets 180 and 182.

One very important feature of the present invention resides in end plates 184 and 186 which are provided with a pair of inwardly extending partial cylindrical fingers 188 and 190 which, as shown in FIGURE 3, are received interiorly of the cylindrical buffer member 150.

In the preferred embodiment, the other of the pair of opposed cushion jaws 114 is similarly constructed but, in a preferred embodiment, may be slightly shorter than the cushioned jaw 116 to prevent abutment of the end plates.

Thus, a resilient tubular buffer member 200 having a hard outer surface 202 and a relatively softer inner portion 204 may be secured to a support backing member 206 by straps 208 and 210.

Support backing member 206 may be provided with end portions 212 and 214 which are similarly arcuately incurvated at 216, as shown in FIGURE 3, and with a centrally concave incurvation 218. End plates 220 and 222 having fingers 224 and 226 are similarly provided.

Support backing member 206 may be secured to beam 130 by a pair of straps 228 and 230 which are secured by bolts 232 and 234 and which may similarly to secured to the beam 130 by bolts and nuts or by bolts received in threaded apertures of the type shown at 166 in FIGURE 6.

Shaking devices of the prior art are conventionally provided with sand bags placed between a pair of ears or abutments. The present resilient cushioned units may be installed by cutting off the abutments now existing on the shaker beam. The remaining portion of each end of the beam will butt against the bottom of the support backing member and may be secured by welding. If it is necessary to remove the center portion between the abutments, the bolts holding the abutments to the center portion on either end may be removed. In this case, the center portion does not have to be welded along the top and bottom edges. All the bolts can be, if desired, drilled and tapped into the plates of the center portion thus eliminating the necessity of having to place nuts thereon.

It has been found that by providing a pair of opposed concavely incurvated backing surfaces a tree or a limb of a similar diameter may be more firmly gripped and the shaking force may be more efficiently transmitted to the tree. It has also been found that by providing arcuately incurvated end portions and partial cylindrical fingers extending into the tubular buffer members, the buffer members are more securely held in place and have a longer life.

While the present invention has been abstracted, summarized and described in very specific terms and with respect to a specific embodiment, it will be realized that the abstract, summary and description are drawn in terms to make the invention most clearly understandable to those skilled in the art and are not intended in the limiting sense. Accordingly, it is intended that the invention be limited only by the appended claims.

I claim:
1. In a fruit and nut harvesting device of the type having a pair of opposed buffered jaws for gripping and shaking trees, the improvement in which at least one of said opposed jaws comprises:
   an elongate tubular resilient buffer member having a pair of opposed ends;
   a buffer member support backing member having an elongate surface proximate to the buffer member for urging the buffer member toward a tree, said surface having a concavely incurvated central section in the elongate direction; and
   means on said buffer support backing member engageable within said open ends of the buffer member for supporting the ends of the buffer member against the ends of the elongate surface of the support backing member.
2. The invention of claim 1 wherein:
   the elongate surface has substantially linear end portions in the elongate direction cooperating with said means to secure adjacent portions of said buffer member therebetween.
3. The invention of claim 2 wherein:
   said end portions are arcuately incurvated transversely of the elongate direction.
4. The invention of claim 1 and
   a pair of opposed end plates secured to the ends of the support backing member, and
   said means comprising a pair of inwardly extending partial cylindrical fingers received interiorly of the cylindrical buffer members, one finger of said pair being mounted, respectively, on each end plate for engagement within an adjacent end of said buffer member.
5. The invention of claim 4 wherein:
   the elongate surface has substantially linear end portions in the elongate direction.
6. The invention of claim 5 wherein:
   said end portions are arcuately incurvated transversely of the elongate direction.
7. The invention of claim 4 wherein:
   the means for supporting the ends of the buffer member further comprises,
   a pair of elongate bands secured to upper and lower surfaces of the support backing member and extending around the buffer member proximate the respective ends thereof.
8. The invention of claim 7 wherein:
   the elongate surface has substantially linear end portions in the elongate direction.
9. The invention of claim 8 wherein:
   said end portions are arcuately incurvated transversely of the elongate direction.
10. The invention of claim 1 wherein both of said pair of jaws are constructed alike.

References Cited
UNITED STATES PATENTS

| | | | |
|---|---|---|---|
| 3,020,695 | 2/1962 | Gould | 294—115 |
| 3,318,629 | 5/1967 | Brandt | 294—103 |

EVON C. BLUNK, *Primary Examiner.*

H. C. HORNSBY, *Assistant Examiner.*